United States Patent [19]

Dickens et al.

[11] Patent Number: 4,910,452
[45] Date of Patent: Mar. 20, 1990

[54] HIGH FREQUENCY AC MAGNETIC DEVICES WITH HIGH EFFICIENCY

[75] Inventors: Frederick T. Dickens, Randolph; Felipe Sarasola, Parsippany; Norman G. Ziesse, Chester, all of N.J.

[73] Assignee: American Telephone and Telegraph Company, AT&T Bell Laboratories, Murray Hill, N.J.

[21] Appl. No.: 352,797

[22] Filed: May 16, 1989

[51] Int. Cl.[4] .............................................. H01F 27/42
[52] U.S. Cl. ..................................... 323/355; 323/356
[58] Field of Search ................... 323/355, 356; 363/29, 363/30, 31

[56] References Cited

U.S. PATENT DOCUMENTS

| | | | |
|---|---|---|---|
| 4,449,174 | 5/1984 | Ziesse | 363/40 |
| 4,605,999 | 8/1986 | Bowman et al. | 363/40 |
| 4,685,041 | 8/1987 | Bowman | 363/40 |

Primary Examiner—Patrick R. Salce
Assistant Examiner—Jeffrey Sterrett
Attorney, Agent, or Firm—Alfred G. Steinmetz

[57] ABSTRACT

Efficient high frequency operation of magnetic devices is achieved by utilizing ferrites that have a low power dissipation hysteresis characteristic and by designing these magnetic devices to operate within an operational range where all applied magnetic forces to the magnetic core have a substantially linear constant permeability response. Within this operational range the hysteresis loop of the selected ferrite material approximates an ellipse with very little area encompassed between the increasing and decreasing B-H locus of the hysteresis loop. The cyclic energy dissipation is significantly reduced as compared to conventional magnetic operations and high frequency operation can be achieved with very high efficiencies.

17 Claims, 4 Drawing Sheets

HIGH FREQUENCY AC MAGNETIC DEVICES WITH HIGH EFFICIENCY

FIELD OF THE INVENTION

This invention is concerned with a method of designing operating power magnetic devices and in particular with applying these devices in a power circuit with high efficiency at high frequencies.

BACKGROUND OF THE INVENTION

Power dissipation in a magnetic device operated in an AC mode has several frequency determined power dissipation characteristics which occur in the magnetic core of the device. Loss attributable to magnetic hysteresis is one of the most common sources of this magnetic core dissipation and is measured by the area internal to the closed curve which is traversed by the locus of the hysteresis loop in each cycle of operation. Given a fixed flux variation from $-B$ to $+B$ or a $\delta B$ the energy dissipation is cyclically constant and hence the power dissipation per unit time increases as frequency increases in a substantially proportional manner.

Power processing circuits which operate magnetic devices in an AC mode are being operated at ever higher and higher frequencies in a quest to achieve very high power densities. Successful operation of these power processing circuits at very high frequency requires a very high efficiency of operation and in particular operation with very low cyclic energy dissipation in the circuit components. Since magnetic hysteresis associated power dissipation is frequency responsive (i.e. constant energy loss per cycle) the magnetic components must operate with very low cyclic energy dissipation. For example inductors operated with a large AC signal component at high frequency are extremely power dissipative because of the substantial area enclosed by the hysteresis loop combined with the very fast cycling times. The constant cyclic energy dissipation in the inductor's magnetic core and the high frequency of operation significantly reduces the efficiency of the circuit.

Magnetic materials are known which have unusual properties that may cause them to be less dissipative during hysteretic cycling than conventional materials. Some such materials are amorphous type magnetic materials. Other materials have been discovered having peculiar hysteresis properties. One of the materials displaying these peculiar hysteresis properties is a class of low permeability nickel-zinc-cobalt (Ni-Zn-Co) ferrites, sometimes known as Perminvar ferrites. Some of these materials have a hysteresis characteristic with a very small enclosed loop area within a range of H drive that never exceeds a critical threshold level. If that critical threshold level is exceeded the hysteresis characteristic reverts to a more conventional hysteresis loop enclosing a considerable dissipation area. Operation is not restored to the very small enclosed loop area of the hysteresis characteristic with reduction in the applied H drive.

The nickel-zinc-cobalt ferrites were developed several decades ago for use primarily in vacuum tube radio receiver circuits. Excitation levels in these applications were very low, and the high inductor Q obtained with the material was required for good receiver performance. Although the unusual hysteretic properties of these materials were known, exploitation of these properties to produce very low loss inductors for transmitters and/or other power applications never occurred. For the most part power magnetics employed and continued to employ higher permeability materials that do not display a significantly reduced hysteresis loop area within a practical range of excitation.

SUMMARY OF THE INVENTION

Efficient high frequency operation of magnetic devices is achieved according to the invention by utilizing ferrites that exhibit very low loss in a region of excitation below a critical threshold and by designing and handling the magnetic device to insure that the excitation level never exceeds this critical threshold. The ferrite used in these devices must have never been excited beyond the critical threshold and must never have this critical threshold exceeded as changes occur in the material that dramatically and permanently increase the loss. A number of low permeability nickel-zinc-cobalt ferrites have been found to possess this property and to have a critical threshold level sufficiently high to be useful in the design of high frequency power converters. Application of this invention may be readily applied to other high frequency electronic equipment such as radio transmitters which could also profitably realize improvements in efficiency with magnetic devices designed using the principles of this invention.

Operating the ferrite core material below the critical threshold level yields a B-H characteristic with a hysteresis loop curve that is substantially linear and has a very small enclosed area. Within this operational range the hysteresis loop approximates an ellipse havine a very high major axis to minor axis ratio with very little area encompassed between the increasing and decreasing B-H locus of the hysteresis loop. The cyclic energy dissipation is significantly reduced as compared to conventional magnetic operations and high frequency operation can be achieved with very high efficiencies.

The magnetic material having this very low loss characteristic retains its low loss if it is properly handled in processing so as not to be exposed to a magnetic field exceeding a critical threshold and is not at any time during use excited beyond a critical field H at which the hysteresis loop for the overexcited material permanently loses its low loss hysteresis characteristic.

DETAILED DESCRIPTION

Figure 1:
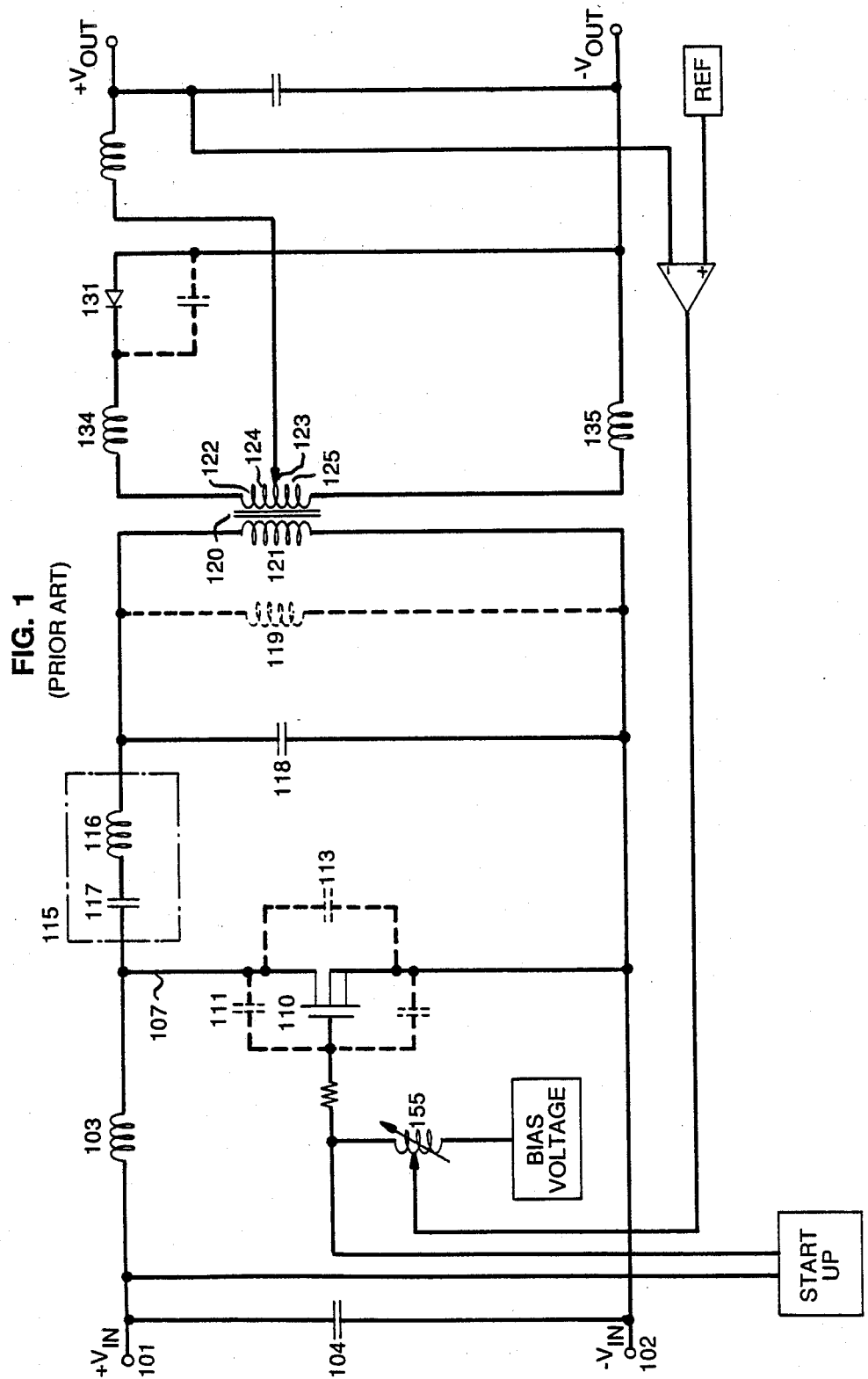
FIG. 1 is a schematic of a high frequency power converter in which the AC magnetic components are operated in accord with the principles of the invention.

A self oscillating high frequency power converter circuit schematic is shown in FIG. 1 in which it is desirable that the AC magnetics be operated with relatively low power dissipation. This converter circuit is a zero-voltage-switching resonant converter in which its efficiency is maximized in many aspects of the circuit including zero-voltage- switching of the power switch to permit efficient operation at very high frequency. High frequency zero-voltage-switching resonant converters, such as are shown in the schematic of FIG. 1, have been previously disclosed in U.S. Pat. Nos. 4,449,174; 4,605,999 and 4,685,041 in which the first patent discloses a driven converter and the latter two patents disclose self oscillating converters.

A DC input voltage is applied to the input terminals 101 and 102. Input terminal 101 is coupled to a filter inductor 103 which in turn is connected to the drain electrode 107 of the MOSFET power switch 110. A filter capacitor 104 is connected in parallel with the input terminals 101 and 102. The MOSFET power switch 110 includes a gate-drain parasitic capacitance 111, a gate-source parasitic capacitance 112 and a drain-source parasitic capacitance 113. The drain electrode 107 is connected to a series L-C network 115 including an inductor 116 and a capacitor 117. L-C network 115 is connected to the primary winding 121 of the converter power transformer 120. Transformer 120 includes a magnetizing inductance 119 and has its primary winding shunted by a capacitor 118. Self oscillation is attained primarily through capacitive feedback from the drain to the gate of the MOSFET power switch. This process is explained in detail in U.S. Pat. No. 4,605,999 and is not repeated herein.

Low loss zero voltage switching of the MOSFET power switch 110 is achieved by controlling the timing and waveforms of the voltage across and the current through the MOSFET power switch 110. This control is achieved by the resonant action of the L-C network 115 and the resonant action of the rectifier load. This is explained in U.S. Pat. No. 4,449,174 and is not repeated herein.

The secondary winding 122 of transformer 120 is center tapped at node 123 creating two secondary winding segments 124 and 125 coupled to rectifying diodes 131 and 132 respectively. The leakage inductance is included in the inductors 134 and 135 in series with the winding segments 124 and 125, respectively. Each of the rectifying diodes 131 and 135 includes a parasitic capacitance 137 and 138, respectively, which in combination with the inductors 134 and 135 enables resonant rectification at the frequency of operation of the converter. A detailed explanation of the operation of resonant rectification is included in U.S. Pat. No. 4,685,041 and is not discussed in detail herein. The rectified signal is connected through a filter inductor 139 and across a filter capacitor 140 to the output terminals 141 and 142.

The output voltage is regulated by comparing it with a reference voltage and varying a frequency of operation of the converter to correct for voltage deviations from the regulated value. The output voltage is sensed by lead 151 and applied to a comparator 152 which compares it to a reference voltage 153 and generates an error voltage on lead 154. This voltage is used to control a controllable inductance 155 to vary the frequency of oscillation of the converter in order to regulate the output voltage. Details of this process are found in U.S Pat. No. 4,605,999 and are not given herein.

While the zero voltage switching contributes significantly to the power switch operating efficiency of the converter, efficiencies in the operation of other critical components must also be realized to attain a desired overall efficiency of converter operation. The AC magnetic components which are subjected to an undulating current, whether including a superimposed DC signal or not, are one such critical component whose efficiency must be maximized. The inductor 116 and the inductance 119 of the transformer 110 are two critical magnetic components because of the large AC component of the undulating exciting signal applied to them. At high frequencies considerable power is dissipated if they are operated conventinally with a typical hysteresis characteristic. It is necessary that these components have a high quality factor in which the ratio of energy stored per cycle to energy dissipated per cycle be a relatively large number.

It is noted that in the illustrative regulated converter of FIG. 1 it is desirable to use an inductor 116 with a large inductance in the LC network 115 in order to accommodate a wide range of line and load variations. An inductor with a conventional characteristic operated conventionally and having a large inductance is quite power dissipative and significantly reduces the overall efficiency of the converter. Using an inductor with a ferrite core selected and operated with high efficiency and also accommodate a wide range of line and load variations.

Figure 2:
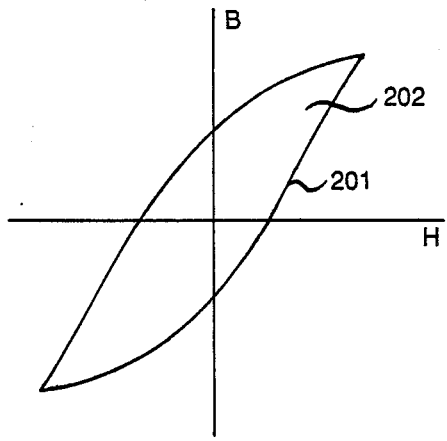
FIGS. 2 and 3 are graphical depictions of conventional hysteresis characteristics of a common magnetic material at different excitation levels.
Figure 3:
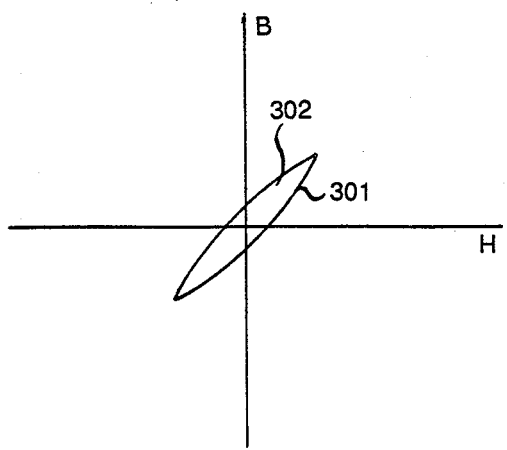
Figure 7:
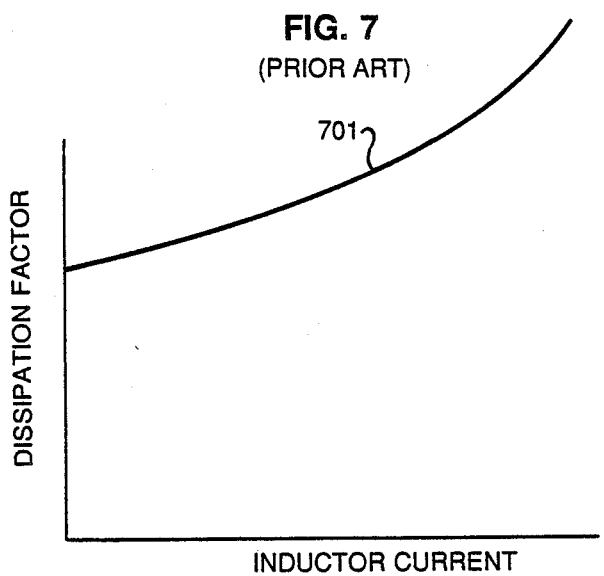
FIG. 7 is a graphical depiction of the core loss characteristics of a prior art inductor of conventional material.

High frequency ferrite cores operated in a conventional manner have a hysteresis characteristic such as shown in FIGS. 2 and 3 have a cyclic power dissipation loss proportional to the area enclosed by the cyclic hysteresis curve. The hysteresis loop 201 shown in FIG. 2 is typical of the excitation required for power magnetic operations at frequencies where the core design must be loss limited rather than saturation limited. Since the area 202 enclosed by the hysteresis curve in FIG. 2, which is representative of the energy lost when the loop is traversed, multiplied by the frequency of operation can be quite high, it is readily apparent that power dissipation in the core can quickly become excessive as the frequency of operation is increased. At lower levels of excitation, as shown in FIG. 3, the area 302 enclosed by the cyclic hysteresis curve 301 is substantially reduced, and, therefore, the core dissipation at high frequencies is reduced. This method of reducing the peak magnetic field in the core to reduce losses is well known, but may still not lead to sufficient loss reduction in power converters operating at the higher frequencies without increasing core dimensions to impractical levels. FIG. 7 shows the same effect from the standpoint of a inductor having another type of core material with normal characteristics. The characteristic curve 701 of power loss in such an inductor is plotted against the magnitude of inductor current at a fixed high frequency. The dissipation factor plotted on the vertical axis is the ratio of energy dissipated per cycle of excitation to the peak energy stored per cycle of excitation. The increasing dissipation factor with inductor current indicates that attempts to increase the energy stored in a given inductor generally result in a greater-than-linear increase in the core dissipation. Thus, loss reduction means reducing the excitation of the core. However, again, this method may still not result in sufficiently low loss in a reasonably sized magnetic component for the higher frequencies of operation which in some instances may range in the hundreds of kilohertz or greater.

Figure 6:
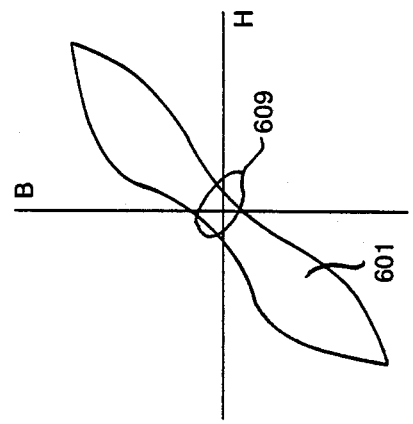
FIGS. 4, 5 and 6 are graphical depictions of the hysteresis characteristics of a magnetic material selected for the magnetic cores of the AC magnetic components in the circuit of FIG. 1 at different excitation levels.
Figure 5:
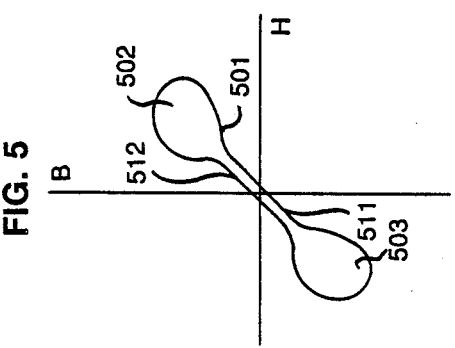
Figure 4:
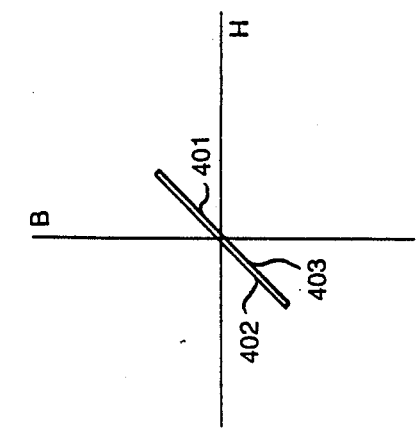

The hysteresis characteristics of low permeability nickel-zinc-cobalt ferrites used in the magnetic devices that are the subject of the invention are shown in FIGS. 4, 5, and 6 for different levels of excitation. These ferrites are sometimes called perminvar ferrites after the material perminvar whose distinctive hysteresis loop also has a narrow waist at the origin of the B-H curve that resembles the hysteresis loop shown in FIG. 6. As the figures indicate, the shape of the hysteresis loop is highly dependent on the excitation level. Most significant, achieving the shapes indicated in FIGS. 4 and 5 depends critically upon the history of the material. In order to obtain the curve shapes shown the material must not have been excited beyond a threshold level that permanently upsets the magnetic domains, leaving a material that can only be used thereafter in a conventional manner. Assuming that the material has no such history, the hysteresis characteristics at low excitation levels approximates an ellipse having a high aspect ratio of its major axis to its minor axis and is shown as bounded by two very straight elliptical sides 401 and 402 in FIG. 4. Very little area 403 is encompassed by this hysteresis loop and the cyclic power dissipation is, therefore, very low.

At higher levels of excitation the power dissipation is increasing, as shown in FIG. 5, since the ends of the hysteresis curve 501 balloon with increasing area 502 and 503 being encompassed by the hysteresis characteristic. These end balloon areas 502 and 503 as shown in FIG. 5 increase the total area enclosed by the loop of the hysteresis curve and result in significant increases in power dissipation. Within a small B-H range adjacent the origin of the B and H axes of the hysteresis plane the locus of the hysteresis loop still approximates two closely adjacent almost straight elliptical side lines 511 and 512 with very little area encompassed between the increasing and decreasing B-H locus of the hysteresis loop before the balloon regions 502 and 503 are encountered. If excitation of the magnetic device is reduced the hysteresis characteristic will still return to the characteristic curve 401 shown in FIG. 4.

As the level of excitation increases beyond a critical field value exceeding the excitation level applied to the core material in FIG. 5 the loop of the hysteresis curve expands symmetrically to enclose a substantial area of hysteresis 601, as shown in FIG. 6. This expanded hysteresis curve enclosed area represents a very sizable power dissipation. The waist 609 of the hysteresis curve has expanded significantly and the characteristic is no longer represented by two closely adjacent almost straight elliptical side lines in the region adjacent to the origin of the B and H axes of the hysteresis plane, as in the example of the hysteresis loop curves shown in FIGS. 4 and 5. In fact the hysteresis characteristic of this magnetic device as so excited cannot be restored to the hysteresis characteristic of FIG. 4 by reducing the applied excitation. This occurs because the magnetic domains are moved elastically in response to excitation below a critical field level and are moved in elastically in response to excitation when this critical field level is exceeded and can no longer be restored to their original elastic condition.

Figure 8:
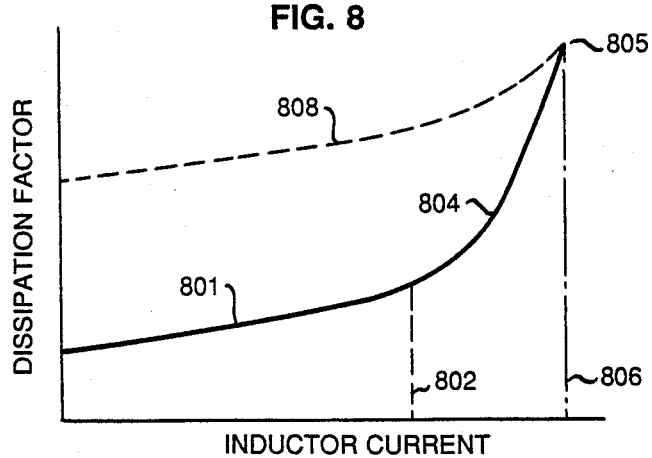
FIG. 8 is a graphical depiction of the core loss characteristics of an inductor having a low loss hysteresis characteristic according to the principles of the invention.

The loss characteristic curve of an inductor having a core with hysteresis characteristics as shown in FIGS. 4, 5, and 6 is shown in FIG. 8. As indicated above, exceeding a critical magnetic field level in such a magnetic device prevents restoration of the hysteresis characteristics illustrated in FIGS. 4 and 5. The loss characteristic of the magnetic materials that have not had a field applied thereto equalling or exceeding the critical field is designated by the curve 801. This curve has a small or moderate slope or region of low loss from the origin of the graph plane to a substantial AC current level value designated as value 802 on the abscissa. Above this current level the loss characteristic curve 804 increases rapidly as current increases due to ballooning of the hysteresis loop as shown in FIG. 5. At the point 805 on the curve 804 attained with a threshold AC current level 806 the critical field is reached and the threshold of irreversibility is attained. If the current exceeds this threshold value 806 the loss characteristic below the threshold of irreversibility is defined by the curve 808. The original characteristic defined by curve 801 cannot be restored by lowering the excitation. This threshold of irreversibility can also be attained with application of a magnetic field of sufficient magnitude exceeding the critical field to the magnetic device as well as by application of exciting current to the device.

By limiting operation of a magnetic component with an appropriate hysteresis characteristic as shown in FIGS. 4, 5, and 6 to undulating inductor currents below the value 802 the hysteresis characteristic experienced by the magnetic device is limited to the portion of the hysteresis loop bounded by the two closely adjacent straight elliptical side lines as disclosed in FIG. 4. By operating within this hysteresis characteristic the cyclic power dissipation of the magnetic device is very low and the magnetic component can be made small and simultaneously exhibit very low loss at high frequencies of operation.

We claim:

1. A method of operating a magnetic component, comprising the steps of:
    selecting a magnetic core having a hysteresis characteristic having in a particular region of excitation drive a hysteresis curve envelope with a high aspect ration and a small enclosed area at an excitation level suitable to operation of the magnetic component, and which is previously unexcited beyond a threshold of a critical field at which a hysteresis loop for the magnetic core permanently loses its hysteresis curve envelop with a high aspect ratio and a small enclosed are like characteristic value, for use in the magnetic component;
    determining a B-H range of the hysteresis curve of the magnetic core in which its hysteresis area is bounded by substantially an ellipse having a high aspect ratio of major axis to minor axis as a defining hysteresis characteristic; and
    operating the magnetic component so that traversal of the hysteresis loop in response to a drive signal remains within the B-H range having the boundaries of the ellipse characteristic.

2. A method of operating a magnetic component as claimed in claim 1,
    comprising the additional steps of:
    continuously limiting the drive signal to a level below a threshold of irreversibility of the magnetic component is attained.

3. A method of operating a magnetic component as claimed in claim 2,
    comprising the additional steps of:
    limiting the drive signal to a region of linear permeability of the magnetic component.

4. A method of operating a magnetic component in a power supply having components operated at high frequency, comprising the steps of:
    determining which magnetic components used in the power supply must accommodate drive signals having a large AC signal component;

selecting a magnetic core for magnetic components that must accommodate drive signals having a large AC signal component with a magnetic material having within a defined excitation range a low loss hysteresis characteristic with a narrow constricted waist at an origin of a plane of hysteresis, and which material is previously unexcited beyond a threshold of a critical field at which a hysteresis loop for the magnetic core permanently loses its central narrow constricted like characteristic value, for use in the magnetic component;

determining a B-H range of the hysteresis curve of the magnetic material of the magnetic core in which its hysteresis area is bounded within a narrow region by a substantially elliptically shaped curve with a high aspect ratio of major axis to minor axis as a defining hysteresis characteristic; and operating the magnetic component so that traversal of the hysteresis loop in response to a drive signal remains within the B-H range having the boundaries of the elliptically shaped curve characteristic.

5. A method of operating a magnetic component in a power supply having components operated at high frequency as defined in claim 4 and further including the additional step of, continuously limiting the drive signal to a level below a threshold of irreversibility of the magnetic component is attained.

6. A method of operating a magnetic component in a power supply having components operated a high frequency as defined in claim 5 and further including the additional step of, limiting the drive signal to a region of linear permeability of the magnetic component.

7. A method of operating at a high frequency a magnetic component having a core material that exhibit a low loss hysteresis characteristic having an ellipse shaped envelop with a high major axis to minor axis ratio; comprising the steps of:

limiting exposure of a magnetic material of the magnetic component to field excitation less than a critical field threshold at which its low loss hysteresis characteristic retains its substantially ellipse curve permeability response;

selecting a magnetic material with such a hysteresis characteristic having a high critical threshold sufficient to permit its application to a relatively high power circuit; and operating the magnetic component having the magnetic material with the low loss hysteresis characteristic as an AC magnetic component in which an AC excitation drive to the magnetic component is always below a level at which the critical field threshold is attained.

8. A method of operating a magnetic component, as claimed in claim 7;

and further including a step in which a magnetic material having a nickel-zinc-cobalt composition is selected for use in the magnetic component.

9. A circuit including a magnetic component excited by an undulating current, comprising:

a magnetic core for the magnetic component; characterized by:

the magnetic core having a hysteresis characteristic with a high aspect ratio to the enclosing hysteresis loop so that the enclosed area proportional to power dissipation for a given excitation drive is small, such hysteresis characteristic dependent upon the magnetic core being excited only by fields below a critical field excitation at which the hysteresis loop for the magnetic core permanently irreversibly loses its high aspect ratio proportions;

the circuit having an operative range of undulating current as applied to the magnetic core occurring within limits whereby the traversal of the hysteresis loop of the magnetic core in response to the undulating current drive remains below a terminal extent of the hysteresis loop at which the critical field excitation is exceeded.

10. A circuit including a magnetic component as claimed in claim 9, further characterized by:

the circuit being operated at a high frequency whereby a large number of hysteresis loop traversals occur in a given time interval.

11. A circuit including a magnetic component as claimed in claim 10, further characterized by:

the enclosing hysteresis loop having a substantially elliptical envelope.

12. A method of organizing a high frequency power circuit, which includes magnetic components, to minimize power dissipation;

characterized by the steps of:

identifying those magnetic components in the circuit excited by an undulating current, selecting a magnetic core for each of the magnetic components having a hysteresis characteristic with a aspect ratio to the enclosing hysteresis loop so that the enclosed are proportional to power dissipation for a given excitation drive is small, such hysteresis characteristic being dependent upon the magnetic core being excited only by fields below a critical field excitation at which the hysteresis loop for the magnetic core permanently irreversibly loses its high aspect ration proportions;

operating the circuit within a limited range of undulating current drive as applied to each of the magnetic cores whereby the traversal of the hysteresis loop of each of the magnetic cores in response to the undulating current drive remains below a terminal extent of the hysteresis loop at which its critical field excitation is exceeded.

13. A method of organizing a high frequency power circuit, as claimed in claim 12, further characterized by the steps of:

operating the circuit at high frequency, limiting undulating current drive and applied excitation so that the enclosing hysteresis loop in response to the undulating current drive and applied excitation remains a substantially elliptical envelope.

14. A magnetic component for application in a circuit in which it is excited by an undulating current, comprising:

a magnetic core for the magnetic component; characterized by:

the magnetic core having a hysteresis characteristic with a high aspect ratio to the enclosing hysteresis loop so that the enclosed area proportional to power dissipation for a given excitation drive is small, such hysteresis characteristic dependent upon the magnetic core being excited only by fields below a critical field excitation at which the hysteresis loop for the magnetic core permanently irreversibly loses its high aspect ratio proportions;

the magnetic core adapted for an operative range of undulating current drive, as applied to it by the circuit, bounded within limits whereby the traversal of the hysteresis loop of the magnetic core in response to the undulating current drive remains below a terminal extent of the hysteresis loop at which the critical field excitation is exceeded.

15. A magnetic component as claimed in claim 14, further characterized in that:

the magnetic component is operated within the circuit at a high frequency thereby having a large number of hysteresis loop traversals in a given time interval.

16. A magnetic component as claimed in claim 15, further characterized in that:

the enclosing hysteresis loop has a substantially elliptical envelope.

17. A magnetic component as claimed in claim 14, further characterized in that:

the magnetic core is of a ferrite material having a nickel-zinc-cobalt composition.

* * * * *